June 10, 1969
D. B. COX
3,449,025
SEALING SYSTEM
Filed June 7, 1966
Sheet 1 of 2
FIG. 1
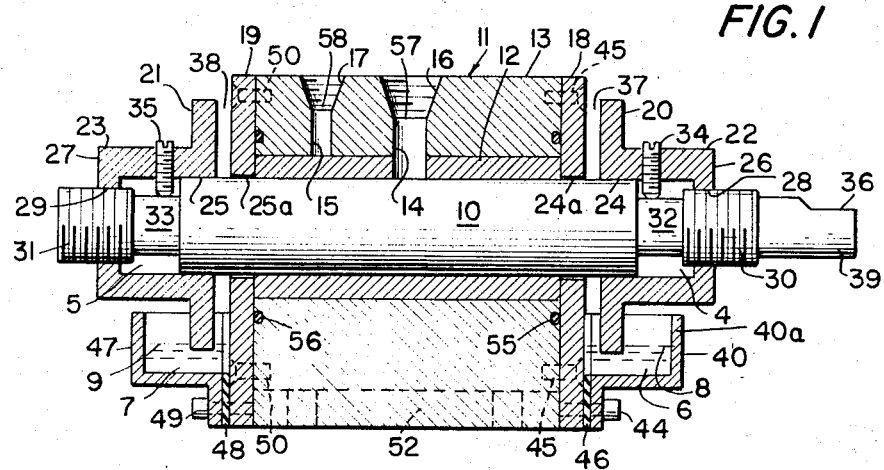
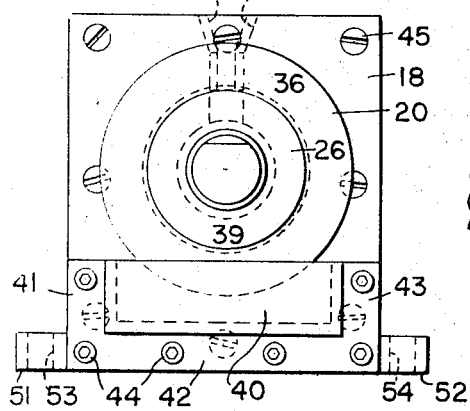
FIG. 2
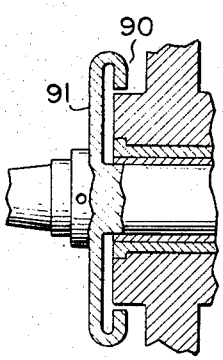
FIG. 6
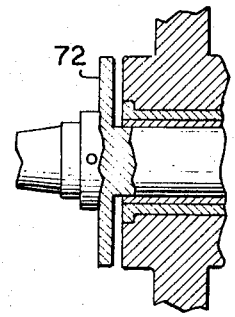
FIG. 7
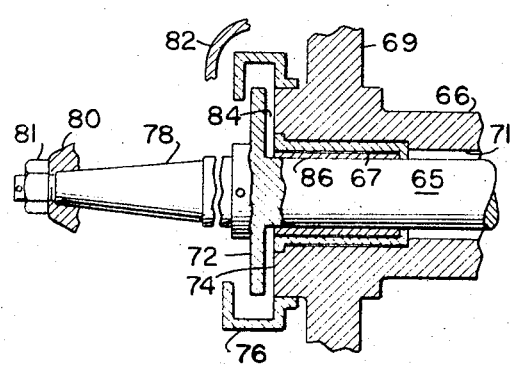
FIG. 5
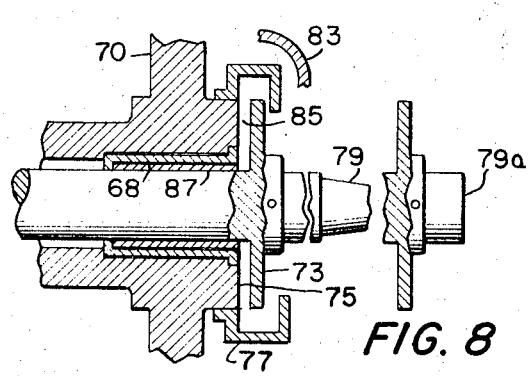
FIG. 8
INVENTOR.
DAVID B. COX
*A. H. Caser*
ATTORNEY United States Patent Office 3,449,025
Patented June 10, 1969

3,449,025
SEALING SYSTEM
David B. Cox, Sewell, N.J., assignor to Mobil Oil Corporation, a corporation of New York
Filed June 7, 1966, Ser. No. 555,785
Int. Cl. F16c 17/02; F16j 15/40
U.S. Cl. 308—36.3                               10 Claims

ABSTRACT OF THE DISCLOSURE

An improved lubricant sealing system is provided in which movement of the lubricant about to escape is opposed by the use of a viscoelastic liquid. The normal forces effect generated in the viscoelastic liquid is in a direction which is in opposition to the directon of the escaping lubricant, with the result that such escape is prevented and the lubricant remains in the desired location.

---

This invention relates to a sealing system for minimizing or preventing leakage of fluids from various structures, such as leakage of oil from lubricated shafts, bearings, and the like.

Oil seals are of course conventional. As applied, for example, to a rotatable shaft to prevent leakage of oil, one type of seal may comprise a grooved ring-shaped support having a sealing element disposed in the groove of the ring with a surface in contact with the shaft. As the shaft rotates, it rubs against the element, and wear may ensue. In another type of seal, a small clearance is provided between the sealing element and the moving structure to avoid wear, but in this case some leakage occurs through the clearance.

According to the invention, a sealing system is proposed in which the movement of oil about to escape or leak is opposed by the action of a viscoelastic liquid. In this system, the lubricated structure to be protected against leakage, such as a shaft supported in a housing or bearing, has clearances through which, but for the action of the viscoelastic liquid, leakage of oil would occur, with the leaking oil passing out from the structure through an exposed end portion thereof. In accordance with the invention, at such end portion a pair of parallel plates are disposed, with one plate stationary and the other rotatable. The viscoelastic liquid is provided in a narrow space between the plates so that it is subjected to rotary shear by stress applied by the rotatable plate; in turn, a normal force effect is generated in the liquid, the direction of which is in opposition to the direction of the escaping oil, with the result that such escape is prevented, and the oil remains in the desired locations.

Among other advantages, the invention provides a means of preventing leakage of oil while at the same time avoiding wear of parts. It is generally applicable to any lubricated structure having a rotatable part such as a rotatable shaft or bearing or housing and the like, being particularly suitable for journal bearings. It is adaptable with little effort to many existing structures of the kind described.

The invention may be better understood by referring to the accompanying drawings in which selected embodiments are illustrated and in which:

FIG. 1 is a central longitudinal sectional view of a device for testing the shear stability of a liquid and in which the principle of the invention is incorporated;

FIG. 2 is an end view of the device of FIG. 1;

FIG. 5 is a broken view, partly in section, showing a bearing-supported shaft for driving a suitable object such as a grinding wheel, propellor, or the like.

FIG. 6 is a partial view showing a modification of FIG. 5;

FIG. 7 is another partial view showing another modification of FIG. 5; and

FIG. 8 shows a modification of the right hand end portion of FIG. 7.

Figure 4:
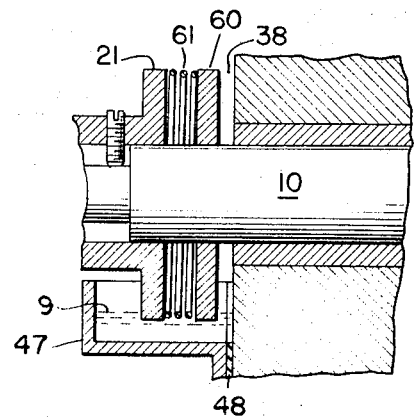
FIG. 4 is a partial view of FIG. 1 showing another modification.

In FIGS. 1 and 2, the shear stability test device comprises a rotatable shaft 10 disposed in a housing 11 which suitably comprises a bearing 12 of bronze or other bearing material mounted in a metal block 13. A hole 14 for introducing lubricant to the shaft extends through both the block and the bearing sleeve, and a smaller hole 15 extends through the block for introduction of a temperature-sensing device such as a thermocouple. Threaded caps, not shown, cover these holes by engagement with the threaded portions 16 and 17.

End pieces 18 and 19 are disposed at the ends of the block and bearing sleeve, and spaced outwardly of each is a plate 20, 21. Each plate comprises a hub portion 22, 23 which engages the shaft 10 at 24, 25. Each hub portion is closed off by an end wall 26, 27 which is apertured at 28, 29, and these apertures are provided with threads which engage corresponding threads on shaft portions 30, 31 in order to fix the hub portions on the shaft 10. The shaft portions 30 and 31 have a somewhat smaller diameter than the shaft 10, and are joined to the latter by reduced portions 32, 33 of even smaller diameter. To further secure the hub portions and plates on the shaft 10, set screws 34, 35 are provided in the hubs for engagement with the reduced shaft portions 32, 33. The engagement provided by the set screws prevents relative rotation of the hubs on the shaft. Outwardly of the portion 30 the shaft terminates in the end portion 39 which is provided with a flat 36.

Referring to the end piece 18 and the adjacent plate 20, these have adjacent surfaces that are substantially flat. Preferably these surfaces are substantially co-extensive in size, although either may be somewhat larger than the other. The piece 18 and plate 20 are further characterized by being substantially parallel, and they are separated by a narrow gap 37, which for purpose of illustration is shown exaggerated in size. The width of the gap may be varied by loosening the set screw 34 and then turning the hub portion 22 to advance it one way or the other along the threaded portion 30. Similarly, the piece 19 and plate 21 have the characteristics just described.

The lower portion of plate 20 extends into viscoelastic liquid 6 in the reservoir 40, which is provided with flanged portions 41, 42 and 43, note FIG. 2, by means of which it is attached to the end piece 18 by bolts 44. In turn, piece 18 is secured to block 13 by bolts 45. A strip 46 of gasket material is inserted between the reservoir and piece 18 to prevent leakage. Plate 20 just dips into the liquid 6, extending slightly below the liquid level 8. Similarly, plate 21 extends into viscoelastic liquid 7 in the reservoir 47, which is attached through gasket 48 to the end piece 19 by bolts 49, and piece 19 is secured to block 13 by bolts 50.

As seen in FIG. 2, bracket portions 51, 52 having bolt holes 53, 54 are provided for securing the device to a suitable surface. It may be seen, too, that while the plate 20 is circular, piece 18 is square, although it may also be circular. The block 13 is square in cross-section, and is provided with conventional O-ring seals at 55, 56.

In operation, the device as indicated is used to test the stability to various shear conditions of a given test liquid, generally a viscoelastic liquid. The test liquid is placed in each reservoir 40, 47, preferably in an amount to cover plates 20 and 21 to a slight extent. Lubricant for the shaft is introduced through opening 14 to a level slightly below the line 57, and this lubricant may be the same as or different from the test liquid. Opening 14 is also useful for observation and for insertion of instruments such as a pressure-sensitive device, and in some cases it may be employed to introduce test liquid. Rotation of the shaft is started, as by driving the same by means of a speed-controlled electric motor, not shown, whose drive shaft is suitably connected to the reduced end portion 39 of shaft 10. Considering the right-hand side of FIG. 1, plate 20 rotates with the shaft while end piece 18, which actually comprises another plate, is stationary. It is to be understood that both plates are substantially parallel to each other and have substantially flat surfaces. Rotation of plate 20 results in the application of a rotary stress to the liquid in reservoir 40, and this liquid then undergoes rotary shear. Gap 37, although shown exaggerated in width, is of such narrowness, and the shear rate of the liquid of such magnitude, that liquid will rise in the gap 37. The liquid will not, however, rise in the wider gap on the right-hand side of plate 20, i.e., the gap between plate 20 and the side wall 40a of reservoir 40, because the shear rate of liquid in this gap is not large enough.

Referring now to the liquid undergoing shear in gap 37, a characteristic of such liquid in rotary shear is that it produces a forces which is normal to the opposed surfaces of the two plates. The direction of the force is toward both plates, i.e., the force expresses itself as one which tries to move the plates apart; however, as neither plate is axially movable, the net effect is to be found in the liquid itself. The normal force is present in the liquid and exerts itself along the common rotational axis of the plates (assuming plate 18 to be rotatable), in this case along the surfaces of the shaft, and the net result is that the liquid in gap 37 exerts a pressure in the direction of plate 18. The liquid also exerts a pressure in the direction of plate 20, and may enter the clearance at 24, but this occurrence is not of significance because the result would be to fill the space at 4, and after it is filled, no more liquid would enter the clerance at 24.

Summarizing briefly the preceding paragraph, the viscoelastic liquid in gap 37, by virtue of the normal force phenomenon, exerts a pressure or force against plate 18 and thus opposes the flow in the reverse direction of lubricant in the clearances between the shaft 10 and bearing 12. In this way leakage of the lubricant is prevented.

In a similar way, a normal force effect is created on the left-hand side of FIG. 1, the direction of which is from left to right so that it opposes the tendency of the lubricant to escape through the left-hand side of the device.

Generally speaking, the viscoelastic liquid, as the term implies, refers to a liquid which exhibits both viscous and elastic behavior; thus it has flow properties of a liquid and elastic properties of a solid. Besides being viscoelastic, the liquid is one which exhibits the normal force phenomenon, namely, during application of rotary stress, it undergoes rotary shear and produces a force normal to the descibed opposed plate surfaces. The liquid is of course a viscous one, as required for a strong normal force effect.

An example of a suitable viscoelastic liquid is a 5% by weight solution in mineral oil of polyisobutylene of a viscosity average molecular weight of $1.23 \times 10^6$. The mineral oil has a kinematic viscosity of 108 centistokes at 100° F. and 9.5 centistokes at 210° F., and a molecular weight of 462. This solution exhibits an apparent viscosity ranging from 1,000 down to about 20 poises at 77° F. and shear rates in the range of 1 to 10,000 reciprocal seconds, and an apparent viscosity ranging from 100 down to 4 poises at 167° F. and shear rates in the range of 1 to 10,000 reciprocal seconds. Plots of apparent viscosity versus shear rate at these various temperatures show curves of sigmoid shape, indicating that the liquid is a pseudoplastic type of non-Newtonian material. At shear rates ranging from about 10 to 1,000 reciprocal seconds, and at temperatures of 77 to 167° F., the liquid exhibits a normal force or normal pressure, expressed as lbs. of total thrust, ranging from about 0.2 to about 6.4 lbs. when tested in a modified Ferranti-Shirley cone-plate rheogoniometer having a cone type shearing element of a radius of only 1.58 inches, a cone angle of 21″, and a maximum speed of only about 30 r.p.m. At any fixed temperature, this relationship between normal force and shear rate is a linear one for this liquid. On scale up, the foregoing value of 6.4 lbs. of thrust (measured at 77° F., 30 r.p.m., and 500 reciprocal seconds) would reach a maximum of 64 lbs. on increasing the radius of the shearing element to 5 inches, and if the rotary speed were increased 10 times to 300 r.p.m., the shear rate would increase to 5,000 reciprocal seconds and the thrust, which increases linearly with shear rate, would increase to 640 lbs. It is thus apparent that the liquid is capable of a normal force of substantial value.

In the environment of FIG. 1, a normal force of 640 lbs. could correspond to a maximum pressure of about 480 p.s.i., which means that the viscoelastic liquid could oppose a tendency of test liquid to leak with a pressure of this magnitude, i.e., 480 p.s.i.

Besides the liquid described, a number of viscoelastic liquids which exhibit the normal force phenomenon are available and may be chosen from both aqueous and non-aqueous systems. They include solutions of high polymers in non-aqueous solvents, high polymers in liquid form, and solutions of certain soaps dissolved in hydrocarbon solvents. More particularly, the liquids include polyisobutylene in mineral oil, poly(alkyl methacrylates) in mineral oil or in dimethylphthalate, polyisobutylene in Decalin or in o-dichlorobenzene, rubber in xylene or in benzene, polystyrene in Decalin or in dimethylphthalate, methylcellulose or sodium carboxymethylcellulose in water, aluminum or calcium soaps of fatty or naphthenic acid dissolved in hydrocarbons, calcium acetate dispersions, glue in water, etc.

Desirably these liquids should have an apparent viscosity in the range of about 1 to 1000 poises or more at a shear rate in the range of about 10,000 to 1 reciprocal seconds. They may exhibit a normal force of up to several hundred pounds of thrust, or from a few tenths, to several hundred p.s.i. These are illustrative values.

The term "liquid" means all fluids other than gases.

Considering further the parallel plates 20 and 18, the said normal force extending along the common axis of the plates is the sum of individual forces which are distributed circumferentially of the plates and which extend radially from the periphery of the plates toward the said common axis. These individual forces are centripetal forces; they have a value of about zero at the periphery and increase in value as one moves toward the said common axis, at which location they have a maximum value. The result of these centripetal forces is to produce a force or pressure gradient, herein designated normal force, such that a maximum force or pressure is present along the said common axis and is available to oppose leakage.

In connection with the centripetal forces, it is to be observed that they are opposed by centrifugal forces, representing the tendency of the liquid between the plates to move radially outwardly. In order that the invention may be operative, the centripetal forces must exceed the centrifugal forces. The amount of total centripetal force available thus becomes important; it has been found to depend on the following variables: the viscoelastic liquid, the diameter of the shear area, the rotational speed, the gap between the plates, and the temperature. Some brief mention of these variables is in order, for as is apparent, the amount of total centripetal force affects the design of the system.

The viscoelastic liquid should generate sufficient total centripetal force to overcome the total centrifugal force.

Any of the above-described liquids is suitable for this purpose. It is an advantage if the viscoelastic liquid and the lubricating or test liquid are one and the same; if they are not, then the two should be mutually compatible.

Total centripetal force increases with the diameter of the plates; or where, as here, one plate is smaller than the other, such force increases with the diameter of the smaller plate. If a smaller plate is used, it is preferably circular. The minimum diameter to provide an effective seal is, from a practical view, preferably of the order of about one inch. The maximum diameter is limited by the desired physical size of the system and therefore cannot well be stated in numerical terms. It may be observed that as diameter increases, and total centripetal force increases, the total centrifugal force also increases. Also, whereas total centripetal force is about zero at the plate periphery, total centrifugal force is at maximum; thus, at reasonable speeds, and especially during start up, some liquid can be lost from the gap owing to the effect of centrifugal force and to the tendency of the liquid to creep around the edges of the plates. However, when steady state conditions prevail, the liquid tends to remain in the shear gap.

Figure 3:
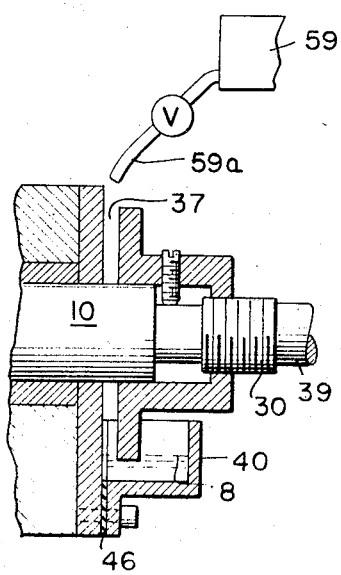
FIG. 3 is a partial view of FIG. 1 showing a modification.

When the rotatable plates are at rest, liquid of course will flow out of the gaps into the reservoirs 40, 47. If desired, to help fill the gaps at start up, a supply tank 59 with valved spout 59a may be operatively disposed relatively to each gap, as shown in FIG. 3. Liquid from this tank may suitably be flowed into the gap as the shaft begins to rotate, and excess liquid is caught in the reservoir 40. When a minimum speed is reached, the liquid will remain in the gap. It will be understood that the arrangement of FIG. 3 may be applicable to all modifications of the invention.

Rotational speed may affect both centrifugal and centripetal forces. When considered with diameter, rotational speed defines total centrifugal force; and when considered with gap width, it defines shear rate distribution along the radius of the gap, and the effect of increasing shear rate is to increase total centripetal force. It follows that if rotational speed is too low, total centripetal force may be too low; practically, the speed is preferably at least 5 or 10 r.p.m. Too high a speed may result in excessive normal force along the shaft surfaces, and place the seal under great strain; it may also degrade the viscoelastic liquid. In this connection a means of alleviating a high normal force, applicable to all modifications, is illustrated in FIG. 4 where there is shown a parallel plate arrangement corresponding to the left hand side of FIG. 1. Adjacent the inner face of the rotatable plate 21 an auxiliary rotatable plate 60 is disposed and is connected to plate 21 through a coil spring 61. As the rotational speed of the two plates increases, the normal force effect acts against the plate 60, which is now axially movable, and moves it toward the plate 21, thus increasing the gap 38. Increasing the gap width acts to decrease the shear rate and in turn the total centripetal force and the normal force.

Regarding the gap size variable, its main effect is as just described. The range of gap size preferably may extend from a low of about 0.001 inch (0.025 mm.), corresponding to engineering tolerances, to a high of about 0.200 inch (about 5 mm.). A more preferred gap is in the range of 0.5 to 5 mm. The larger sizes lead to more moderate shear rates and increased fabrication ease.

The temperature of the viscoelastic liquid, during use, is desirably controlled to maintain the normal force at a substantial level of magnitude. Generally, viscoelastic liquids will be effective at temperatures in the range of 50 to 100° F., although it is to be understood that liquids can be selected to operate in different ranges, for example, —50° to 0° F., 75° to 175° F., 200° to 300° F., etc. Conventional means of temperature control are suitable, comprising the use of internal ducts in the housing and/or bearing for circulation therethrough of a cooling fluid, or the provision of fans suitably operated by the shaft, and the like.

While it is possible to use a parallel plate structure at one end only of the system, a double end structure as shown is preferred because it not only provides positive seals but also confers a dynamic axial stability. In the structure shown, should the rotatable plates be displaced by axial movement of the shaft so that the gap spacings are no longer equal, then it may be noted that the shear rate will increase in the smaller gap and decrease in the larger. As normal force is a function of shear rate, the normal force at the smaller gap will be greater than at the larger gap and thus act to return the shaft to a position in which the gaps are equal.

In FIG. 5, the lubricant sealing system is shown in connection with a shaft for driving a device such as a grinder or the like. The shaft is shown at 65, being driven by means not shown, and is enclosed in a housing 66 where it is supported at each end portion by bearings 67, 68, each of which comprises concentric sleeves of bearing material. Supports for the device are generally indicated at 69 and 70. Between the bearings 67 and 68 is a space 71 for lubricant, which may be introduced thereto by suitable means not shown. A rotatable plate 72, 73 is fixed to each end of the shaft for rotation therewith, while the companion stationary plate comprises end faces 74, 75. Retaining flanges or reservoirs 76, 77 for the viscoelastic liquid extend from each end of the housing over and around the periphery of the rotatable plates. The shaft has extended tapered end portions 78, 79 on which are mounted grinding wheels, one of which is partially shown at 80, being retained by a nut 81. A shield partially shown at 82, 83 prevents dust and dirt from coming in contact with the plates 72, 74 and 73, 75.

The system operates on the same principle as that of FIGS. 1–2. The shaft is rotated and viscoelastic liquid is introduced to the gaps 84, 85. Under steady state conditions, the liquid remains in the gaps and is subjected to shear by the applied stress, producing a normal force effect which exerts itself in a direction extending from the rotatable plate toward the stationary plate. In the result, the tendency of the lubricant in space 71 to leak through the clearances 86, 87 is opposed by the normal force effect of the viscoelastic liquid.

Where the driven device is single ended rather than double ended, as for example in the case of a propellor for a boat, the tapered shaft portion 79 is omitted and the shaft 65 simply finished off square as at 79a in FIG. 8, or if the shaft is to be driven at this end, it is finished off for reception of a driving coupling or the like.

It is also feasible to omit the rotatable plate and reservoir on one side, say the right hand side, of FIG. 5 and to close off such side as by means of a conventional packing gland, not shown. Lubricant would then move along the shaft by virtue of its rotation and would be prevented from leaking by the packing gland on one side and by the parallel plate structure on the other side.

A modification of FIG. 5 is shown in FIG. 6 comprising the omission of the seperate reservoirs 76, 77 in favor of reversely curved extensions, one of which is shown at 90 on the rotatable plate 91. Use of the latter thus eliminates an extra structure.

Another modification of FIG. 5 may be seen in FIG. 7, again comprising the omission of the reservoirs 76, 77, leaving only the plates 72, 73, of which 72 is shown. This modification is useful for steady state operation, and in order to fill the gaps with liquid, a temporary or removable reservoir, not shown, may be employed in conjunction with filling apparatus such as shown in FIG. 3.

While the invention as described has dealt with the leakage of oil from various structures and the prevention of same, it is to be understood as applicable to the problem of leakage of many other fluids from environments in which they are present, such as leakage of various process fluids from vessels through openings therein in which are disposed the rotatable shafts of stirring devices and the like. According to this broader concept, process fluid may find its way from the vessel into one end of the housing or sleeve which supports the rotatable shaft of the stirrer or other device and then work axially along such shafts to the opposite free end thereof. By providing a plate on the shaft closely adjacent such free end, and forming the free end so that it constitutes a fixed plate, and disposing a viscoelastic liquid in the resulting narrow gap between the plates, escape of the process fluid may be prevented substantially in the manner described.

The terms "outer" or "outwardly," as used in connection with points disposed radially of the plates, refer to points disposed toward the periphery of the plates, while "inner" or "inwardly" refers to points disposed toward the axis of rotation of the plates. When used to refer to points located axially of the shaft, "outer" or "outwardly" refers to points disposed away from the transverse center or midpoint of the shaft, while "inner" or "inwardly" refer to points disposed toward such transverse center.

It will be understood that the invention is capable of obvious variations without departing from its scope.

In the light of the foregoing description, the following is claimed:

1. In a device comprising a lubricated rotatable member supported by a housing which is stationary relatively to the member and wherein lubricant is present in the housing and tends to move axially of the member toward one end of the housing, an improved lubricant sealing system comprising a substantially flat plate fixed to the member and slightly spaced from said end of the housing to form therebetween a narrow gap, said end of the housing opposite said plate having a substantially flat surface, said plate and surface defining said gap and being substantially parallel to each other with the plate being rotatable with the member while the surface is stationary, a viscoelastic liquid in said gap, rotation of the member and plate acting to apply stress to said liquid and to subject the same to rotary shear, said liquid in shear generating a normal force, and said normal force effect acting to oppose the movement of said lubricant toward said end of the housing.

2. The device of claim 1 wherein said rotatable plate has a peripheral flange portion which extends toward said end of the housing and which forms an annular recess for holding said liquid.

3. The device of claim 1 wherein a stationary plate is mounted on said end of the housing, said stationary plate having a peripheral flange portion which extends over and around the periphery of said rotatable plate in a direction away from said end of the housing.

4. The device of claim 1 wherein said lubricant and liquid are separate materials, said liquid being compatible with the lubricant.

5. The device of claim 1 wherein said lubricant and liquid are one and the same material.

6. The device of claim 1 wherein means are provided adjacent the periphery of said gap for introducing liquid thereto.

7. The device of claim 1 wherein means are provided for alleviating the effect of an excessive normal force, said means comprising a spring-biased axially movable rotatable plate connected to said first rotatable plate and interposed between the same and said housing end, said spring-biased plate being axially movable by an excessive normal force in a direction to increase the width of said gap, thus decreasing the shear rate and in turn the normal force.

8. In a device comprising a lubricated rotatable shaft supported in a housing which is stationary relatively to the shaft, said shaft having end portions which are supported by bearings in said housing and which extend beyond said bearings, and wherein lubricating oil is present in the housing in contact with the shaft and tends to move axially thereof and to escape through an end wall of the housing, an improved lubricant sealing system comprising a plate fixed to the shaft outwardly of a bearing and slightly spaced away from said end wall, said plate and end wall having adjacent surfaces that are substantially flat and substantially parallel to each other and which define a narrow gap therebetween, said plate being rotatable with the shaft while said end wall is stationary with the housing, a viscoelastic liquid in said gap, rotation of the shaft and plate acting to subject the liquid in the gap to rotary shear and said liquid in shear generating a normal force in a direction extending along said shaft and in opposition to the movement of said oil, whereby the normal force effect acts to prevent leakage of said oil through said end wall of the housing.

9. The device of claim 8 wherein a plate is fixed on the shaft outwardly of the other bearing and is slightly spaced away from another end wall so as to form therewith another gap like said first gap, said second gap having a viscoelastic liquid therein which during rotation of the shaft functions as described.

10. In a device comprising a rotatable member supported by a housing which is stationary relatively to the member and wherein a fluid is present in the housing and tends to move axially of the member toward one end of the housing, an improved fluid sealing system comprising a plate fixed to the member and slightly spaced from said end of the housing to form therebetween a narrow gap, said plate being rotatable with the member, a viscoelastic liquid in said gap, rotation of the member and plate thereon acting to subject the viscoelastic liquid in the gap to rotary shear which in turn generates a normal force, said normal force acting to oppose the movement of said fluid toward said end of the housing and thus to prevent leakage of same.

References Cited

UNITED STATES PATENTS

| 1,784,104 | 12/1930 | Masterson | 277—13 |
| 2,711,332 | 2/1955 | Audemar | 277—13 |
| 2,714,045 | 7/1955 | Simenson | 277—13 X |
| 2,809,311 | 10/1957 | Kohlhagen | 308—121 X |
| 2,886,350 | 5/1959 | Horne | 277—14 |
| 3,007,560 | 11/1961 | Weir. | |
| 3,212,829 | 10/1965 | Gross | 308—121 X |
| 3,215,235 | 11/1965 | Kamm. | |
| 1,258,218 | 3/1918 | Hicks | 308—36.3 X |
| 1,919,248 | 7/1933 | Murphy | 277—133 |
| 1,957,054 | 5/1934 | Waldorf | 277—133 X |
| 2,299,119 | 10/1942 | Yeomans | 308—36.3 |
| 2,710,205 | 6/1965 | Brkich | 308—36.3 X |

FOREIGN PATENTS

| 315,789 | 6/1930 | Great Britain | 277—14 |

MARTIN P. SCHWADRON, *Primary Examiner.*

L. L. JOHNSON, *Assistant Examiner.*

U.S. Cl. X.R.

277—67, 133; 308—121, 127